United States Patent
Ackermann et al.

(10) Patent No.: US 6,246,462 B1
(45) Date of Patent: Jun. 12, 2001

(54) APPARATUS FOR PRODUCING PHOTOGRAPHIC COPIES

(75) Inventors: Rudolf Ackermann, Widen; Albert Dünner, Zürich; Edmund Fendt, Schneisingen; Helmut Lussky, Teufen, all of (CH)

(73) Assignee: Gretag Imaging AG, Regensdorf (CH)

( * ) Notice: Subject to any disclaimer, the term of this patent is extended or adjusted under 35 U.S.C. 154(b) by 0 days.

(21) Appl. No.: 09/396,469

(22) Filed: Sep. 15, 1999

(30) Foreign Application Priority Data

Sep. 15, 1998 (EP) .................................................. 98117440

(51) Int. Cl.⁷ .......................... G03B 27/32; G03B 29/00; G03B 27/52; B65H 20/30
(52) U.S. Cl. ................................. 355/32; 355/27; 355/28; 355/29; 355/40; 226/104; 226/118
(58) Field of Search .................................. 355/27, 28, 29, 355/32, 40; 226/118, 104

(56) References Cited

U.S. PATENT DOCUMENTS

| 4,127,225 | 11/1978 | King . | |
|---|---|---|---|
| 4,136,946 | * 1/1979 | Nishimoto | 355/28 |
| 4,782,354 | 11/1988 | Gregoris . | |
| 5,162,842 | * 11/1992 | Shiota | 355/40 |
| 5,237,359 | * 8/1993 | Rosenberg et al. | 355/28 |
| 5,432,580 | * 7/1995 | Tokuda | 355/27 |
| 5,475,493 | * 12/1995 | Yamana | 355/77 |
| 5,488,450 | * 1/1996 | Tanibata | 355/38 |
| 5,867,252 | * 2/1999 | Tanibata | 355/38 |

FOREIGN PATENT DOCUMENTS 0 684 505 A1  11/1995  (EP) .

* cited by examiner

Primary Examiner—Russell Adams
Assistant Examiner—Khaled Brown
(74) Attorney, Agent, or Firm—Burns, Doane, Swecker & Mathis, LLP

(57) ABSTRACT

The invention relates to an apparatus for producing photographic copies of film negatives on a web-shaped endless material which includes a device for the shining through or scanning of picture originals, whereby a first device for producing the copies on the web-shaped endless material is provided and a second device for producing data or image data fields subsequent to the first device is provided, whereby a material storage (58) is provided between the first and second device, whereby in accordance with the invention the material storage is a space in which the material web with the copies is randomly laid down through an input and removed through an output on demand. (FIG. 2)

14 Claims, 3 Drawing Sheets

APPARATUS FOR PRODUCING PHOTOGRAPHIC COPIES

FIELD OF THE INVENTION

The invention relates to an apparatus for producing photographic copies. Such an apparatus includes a device for shining through or scanning image originals which are processed in the form of a band shaped endless material. Furthermore, a first device is provided for producing the copies and the second device is provided for producing data or image data fields on the band shaped endless material with the copies. A material storage is positioned between the first and the second device.

1. Background Art

An apparatus of the generic type is disclosed, for example, in EP 0 684 505 A1. In such an apparatus according to the prior art, variations in the travel speed of the endless material occur, the cause of which are described further below. This results in that in an optical exposure station of the prior art, for example, a higher operating speed is possible in the device for producing the copies than in the second device for producing the image data fields, here a CRT exposure station. Otherwise, the CRT exposure station is only relatively rarely used, while the conventional optical exposure station is used for each individual copy. In this concrete example, the CRT exposure station is used at the beginning of each order for a specific number of pictures which are possible on a photographic film, for example, 24, 36 or the like, for producing an index print. Such an index print shows all pictures of an order in reduced format so that it is possible to reproduce or inspect all pictures of an order in a small format on a copy format. In such an arrangement according to the prior art, the differences in speed between the different exposure stations or the first and the second device for producing copies or image—or image data fields, must thus be taken into consideration, whereby the prior art suggests a length dependent feed control, whereby the exposed copies are buffered in a material storage between the first device, which means here the conventional optical exposure station, and the second device, which means here the CRT exposure station. Thus, a control of the feed of the material band (also referred to as "material web" in the following) material web is carried out depending on the length in units of measure or other length units, for example, the preselected length of a copy.

2. Summary of the Invention

It is the object of the present invention to further develop a generic apparatus so that it can be more economically and reliably used.

It is in this respect especially an object of the present invention to provide a buffer storage or material storage for a generic apparatus which is able to handle the different input or output speeds.

According to the invention, this object is achieved in that the material storage is a space in which the material web with the copy or the copy material web is randomly deposited through an input and removed on demand through an output.

Through the use of such a material storage, which could also be referred to as chaos storage, it is possible to carefully guide the material web with the copies into the storage, to store it with little space being required and to again carefully remove it from the storage on demand.

Conventional storages (conventional roller storage) carry out a material storage through rollers in that the copy material band is directed over rollers having a larger or smaller spacing, depending on the amount of excess copy material band (similar to a pulley block). When rollers are used, this cannot only lead to damage of the material web by the surface of the rollers, but also a large mechanical force is created which pulls on the web and may even lead to rupturing of the material web. Furthermore, a conventional storage with its various rollers and the roller lift is also very expensive in terms of costs and space.

Preferably, a deflecting arrangement is positioned at the output of the material storage which ensures that a material web which is fed by jerks and with high acceleration into the material storage does not undesirably get caught between output rollers at an output gap which actually should only grab the end of the material band located in the material storage. Because it has been found that a deposit structure of the material band occurs in corresponding storages which regularly would lead to a loop of the material web being caught in the gap between the output rollers so that the material web could not only be kinked, but also completely destroyed. An adequate length dependent feed control is of course also no longer possible after such an accident. For this reason, a deflecting arrangement, preferably in the form of a high tension electrode, a roller, a ventilator, or the like is provided which ensures that a material band loop which is not intended for the output is kept away from the gap between the output rollers.

When the input and output of the material storage are positioned at different heights, the frequency of the occurrence where a material loop not intended for the output is caught in the gap between the output rollers can be reduced. The output is thereby preferably positioned higher than the input. Nevertheless, even with such a configuration, a deflecting arrangement is very advantageous, since otherwise the although less frequent mentioned disadvantageous occurrences would still massively handicap a regular operation of a generic apparatus.

Of course, the input and the output can be substantially or exactly opposite, especially when the deflecting arrangement functions properly.

It has further proven advantageous to provide one of the side walls of the material storage with openings which extend perpendicular to the lowest plane of extension of the copy material web. It has been found that during feeding of the material web, when it folds itself accidentally in the form of loops in the material storage, significant amounts of air between the loops of the material web must be displaced. Conversely, this amount of air must again be fed in when the material web is pulled out. This can occur through the openings in the walls or side walls of the material storage. Otherwise, the air would have to be removed or fed in through a small gap between the closed walls of the material storage and the copy material web. The thereby occurring pressure or suction situations would stress the material web more and lead to uncontrolled movements which could lead to the material web contacting the inner walls of the material storage in an undesired manner so that the material web could be scratched or damaged.

In order to ensure that a material web section is only then pulled out of the material storage at high speed for processing or exposure in the downstream second device for producing data or image data fields on the band shaped endless material web when a corresponding amount of stored material web is present in the storage, a monitoring device can be provided at the input and/or output of the material storage which monitors the actual amount of stored copy material web. If, for example, because of high exposure times of several copies, a large delay occurs in the first device for producing the copies, it could in some instances occur that not yet sufficient material web is present in the material storage for the next process step in the second device for producing data or image data fields, in order to be able to guarantee a sufficient feed. Without a monitoring device, the material web could be ripped or damaged, in this case, during removal of the material web from the material storage. A length control for the correct placement of a frame region of the material web intended, for example, for an index print or another informative exposure, would in such a case not be possible. Correspondingly, a length controlled transport would only be possible with difficulty when, because of the pressure and suction effects in the material storage the slip between the material web and the transport devices could no longer be calculated because of the randomness of the deposit in the material storage.

A corresponding monitoring of the amount of copy material web present in the material storage can be carried out especially advantageously when, for example, a marking arrangement is provided in the region of the first device which provides a marking at or on the copy material band, whereby the marking indicates where or when the second device is to be activated. The monitoring arrangement in this way can always determine if one, two or three, or even more use regions on the material band are present in the material storage for the second device, for example, a CRT exposure device. Correspondingly a monitoring arrangement can also be provided, for example, at the output of the material storage or at the second device which again subtracts the amount of the events counted at the input of the material storage so that it is always clear how many material band regions to be processed by the second device are present in the material storage, also called chaos storage. With such a control, any length units, the slip or the like are no longer important, but only that events are detected and immediately lead to reactions, for example, activation of the second device, deceleration of the material web in the second device, inactivation of the output device for the removal of the material web from the material storage, when not at least, for example, one or two events are detected by the monitoring arrangement at the input of the material storage, or the like.

It was further a disadvantage of the buffer storage according to the prior art (conventional roller storage) that the buffer storage could only be in one of three operating conditions, namely, "empty", "with capacity" or "full". "Empty" meant that the material web was tightened straight between the input and the output. "Full" meant that the distance between the upper and lower rollers around which the band meanders is at a maximum and that a further lowering of the lower rollers is no longer possible. A further feeding of the web would then lead to a loss of the web guiding and thereby to a web jam. Because of the small conventional storage size (about 3 to 4 m), only a small prewarning time for the control of the transport speed could be given by way of sensors, since otherwise, a large part of the storage would have been used up for the prewarning. Therefore, the transition between "with capacity" and "empty", as well as "with capacity" and "full" occurred abruptly. When the storage was full, an immediate transport stop of the material band was required. The same was true when the storage was empty. Advantageously, an embodiment in accordance with the invention provides a continuous transition between empty and full, whereby the buffer storage, even in the full condition, principally still has capacity, while the storage in the buffer storage upon a further filling could increasingly impair the quality of the material web. Even in the empty condition, the storage is principally still output capable so that a moderated reduction of the speed on the output side of the material storage can be carried out. Because of these principally different properties of the buffer storage in accordance with the invention, the speed of the material band can be continuously controlled in the apparatus in accordance with the invention for producing photographic copies, and an abrupt stoppage of the speed can at least mainly be done away with. In accordance with the invention, the control is especially directed to a "nominal length" of the material web in the buffer storage which represents the operating point of the control. This operating point can lie, for example, in the range of 4 to 7 m. The buffer storage is, however, for example, so constructed that it can easily take up, for example, 8 to 15 m and that its upper limit is only reached at, for example, 25 m. Because of this special property of the buffer storage, the control program used for the control of the transport speed of the material web can especially be based on the principle of the fuzzy logic which causes a continuous change of the transport speed. The upper limit of the length of the material band can be set, for example, in the range above 15 m and, for example, below 50 m by appropriate construction and/or control. The use of an upper limit for the length is advantageous in that the material web cannot be compressed by its own weight and expensive support mechanisms for the supporting of the material web can be dispensed with.

The length of the band present in the material storage is preferably monitored by sensors. Thereby, for example, the input or output length is measured (for example, by way of the number of rotations of the feed or output rollers which feed material to the storage or remove it therefrom). The length actually present in the storage can be determined, for example, from the difference between the input and output length (accountant principle). Alternatively or additionally, a sensor is provided in the storage which determines the length present therein. It can detect, for example, that no more web material is present below a selected height, whereby the height is preferably selected such that the web in such a case because of its own weight hangs smoothly between the output rollers and the input rollers. The sensor can be constructed, for example, as a light barrier which is activated when the hanging band is lifted above a selected level. When the sensor is activated, the length determination can be set to zero (storage is defined as "empty"), and especially the transport speed on the output side reduced, whereby the deceleration need not be abrupt, since the storage can still supply length (for example, 0.1 to 0.2 m) because of the sagging, but not tightened web.

Contrary to the conventional roller storage, the material storage in accordance with the present invention is preferably provided with a lateral guide. An allowance is preferably provided between the material web and the guide. The allowance within the material storage is preferably in the percent range of the width of the material web (for example, 1% to 10%, at a web width of, for example, 89 mm to 127 mm, i.e., for example, 5 mm). A further guide is preferably provided in the vicinity of the output roller pair. The allowance thereof is preferably significantly smaller. Preferably, the allowance lies below 1% of the material web width (for example, 0.1% or, for example, 0.1 mm). Preferably, the guide of the material storage is provided by the already mentioned side wall which especially has openings. The guide in the material storage in accordance with the invention provides a guiding of the material web, contrary to the prior art, during the random or chaotic or irregular meandering of the material web in the material storage, in accordance with the invention. The width of the guide is preferably adjustable so that it can be adapted to changing widths of different material webs.

Within the framework of the present invention, the material storage described herein 11, can not only be used for the apparatus for producing photographic copies, but can be used in general as buffer storage for web-shaped photographic material. The invention therefore relates especially to a material storage as buffer for web-shaped photographic material, whereby the buffer is used within the framework of a photographic material transport arrangement in order to especially buffer a photographic material band during fluctuations in the transport speed.

BRIEF DESCRIPTION OF THE DRAWINGS

The present invention will be further described in the following by way of a preferred embodiment. Further features, advantages and objects according to the present invention are thereby disclosed with reference to the attached illustrations, wherein.

DETAILED DESCRIPTION OF THE INVENTION

Figure 1:
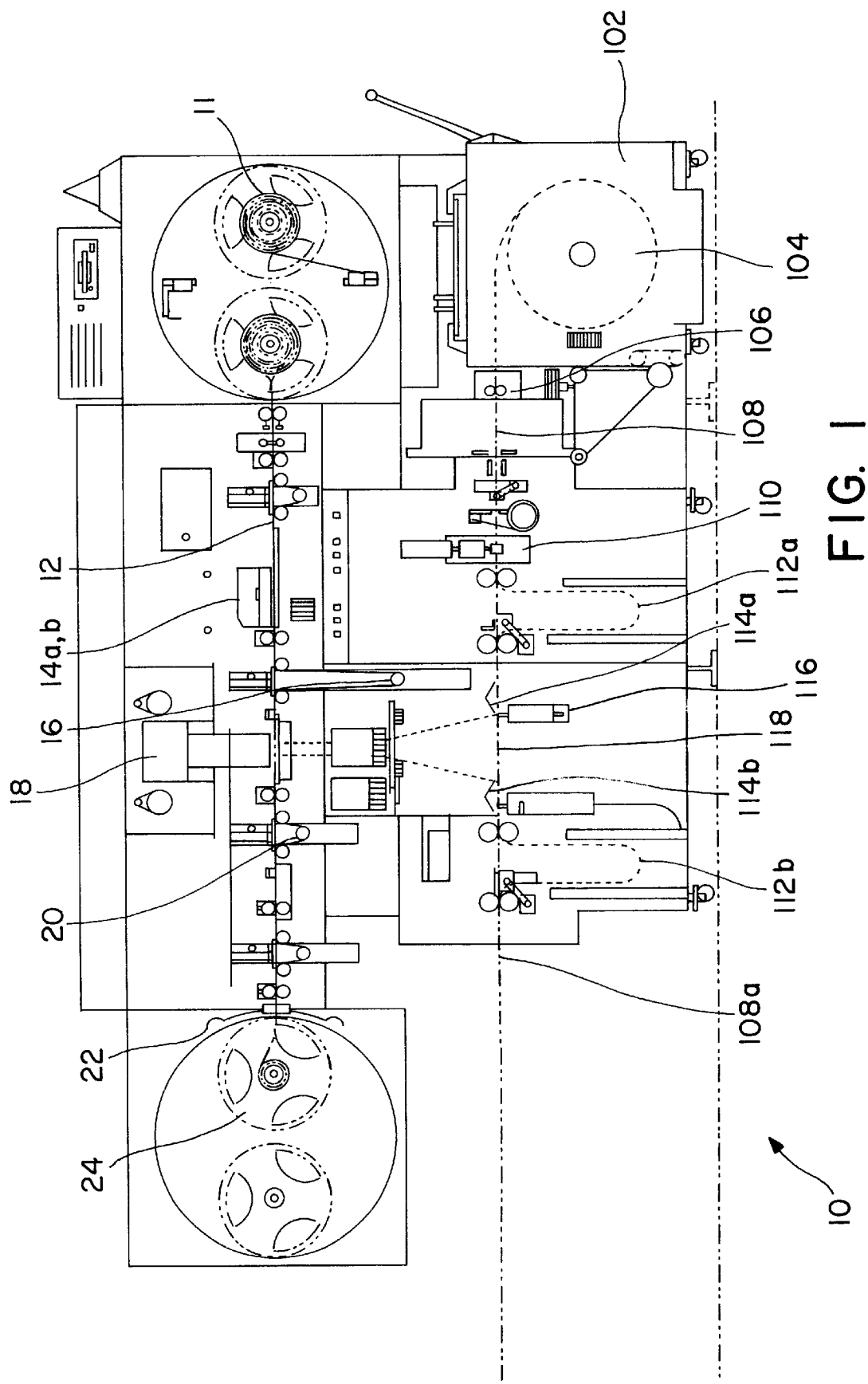
FIG. 1 is a schematic partial view of a preferred embodiment with features according to the invention.

An apparatus for producing photographic copies on a web-shaped endless material, in the following, simply called "printer", is referred to by reference numeral 10 in FIG. 1.

The printer 10 includes a section for the feeding of negatives or positives in the form of an endless web. This arrangement 11 includes a carousel with two web reels with webs 12, which are fed into the apparatus 10. A scanning arrangement 14a, b, which includes a colour scanner (14b, right) with low resolution and a black and white scanner (14a, left) with high resolution, scans the web with image information. The black and white scanner detects whether the images on the web 12 are sufficiently focussed so that the production of a photographic copy would be meaningful or not, and the colour scanner detects colour density values in order to enable and optimize control of the intensities of the individual colours with which later a negative or the like is to be illuminated in order to make an optimized copy possible.

The image data from the scanner duo 14a, 14b, are also assembled in a computer or processor to coloured image data of high resolution with which an index print can be produced for each respective order. A material web section of exposed negative or positive material can be received in a material web storage 16 which corresponds to a maximum order volume, i.e., for example, 36 negative. In this manner, a statement can be made regarding all pictures or a part of the pictures of an order prior to the illumination of the first negative of an order, for example, regarding the general mood of the pictures, such as an evening mood, a twilight mood, possibly a row of portrait pictures, or the like. These data can also be used to produce exposure data.

The negatives or positives of the web 12 are then fed to an exposure station 18 which in the example described is a conventional optical exposure station. Of course, a CRT exposure station can also be provided here, or an exposure station operating with lasers. The here explicitly provided optical exposure station adjusts an exposure on the basis of the light amounts or coloured light amounts determined by the exposure data captured by the scanner duo 14a, 14b and calculated by a computer, possibly through a subtractive filter arrangement or the like. The exposure station 18 also includes enlargement lenses (without reference numeral) which are provided in the light path below the exposure arrangement 18.

Various storage buffers 20 are positioned along the course of the transport path of the web 12 in order to enable a better temporal or distancewise adaptation of the material transport to the individual activities. At the end of the passage of the material web 12, another reel arrangement 24 is provided in order to wind the processed material of the web 12 back onto storage reels. In order to guarantee an automatic operation, a threading in arrangement 22 is provided which assists in winding the arriving end of the web 12 (i.e., the start of the web) onto a reel until the material has sufficient hold so that the web 12 can be further automatically wound up onto the reel. The arrangement 24 also includes a carousel in order to be able to provide an empty reel after removal of a full reel to guarantee a continuous operation of the arrangement according to FIG. 1 or FIGS. 1 and 2.

A light sensitive band 108 is unwound from a material web roller 104 in a magazine cart 102 (also called "cassette"). This material web 108 is guided out of the magazine cart 102 through a feed-in station 106 and guided to a later exposure process.

A splicer arrangement is provided within a path of the web 108 which connects the end of a leading material web 108 with the start of a following material web by heat and pressure.

In the path of the band 108 are furthermore provided loops 112a, 112b, in order to enable a temporal coordination of the actions within the first device for producing the copies. In the region of the illumination 118 of the material web 108, light traps 114a, 114b (also called paper masks) are provided which are intended to keep light of an exposure process away from proceeding and following surfaces of the photo sensitive material web 108. A marking device 116 is provided at the beginning of the illumination region which marks the end of an order or the region which is kept free of a copy in order to be exposed in a second device for producing data or image data fields (see FIG. 2). The marking device 116, for example, can spray a colour dot onto the back face of the material web. Punch outs or the like can also be provided. Advantageous patterns for markings in the form of colour dots, punchings or the like are apparent from FIG. 3.

Figure 2:
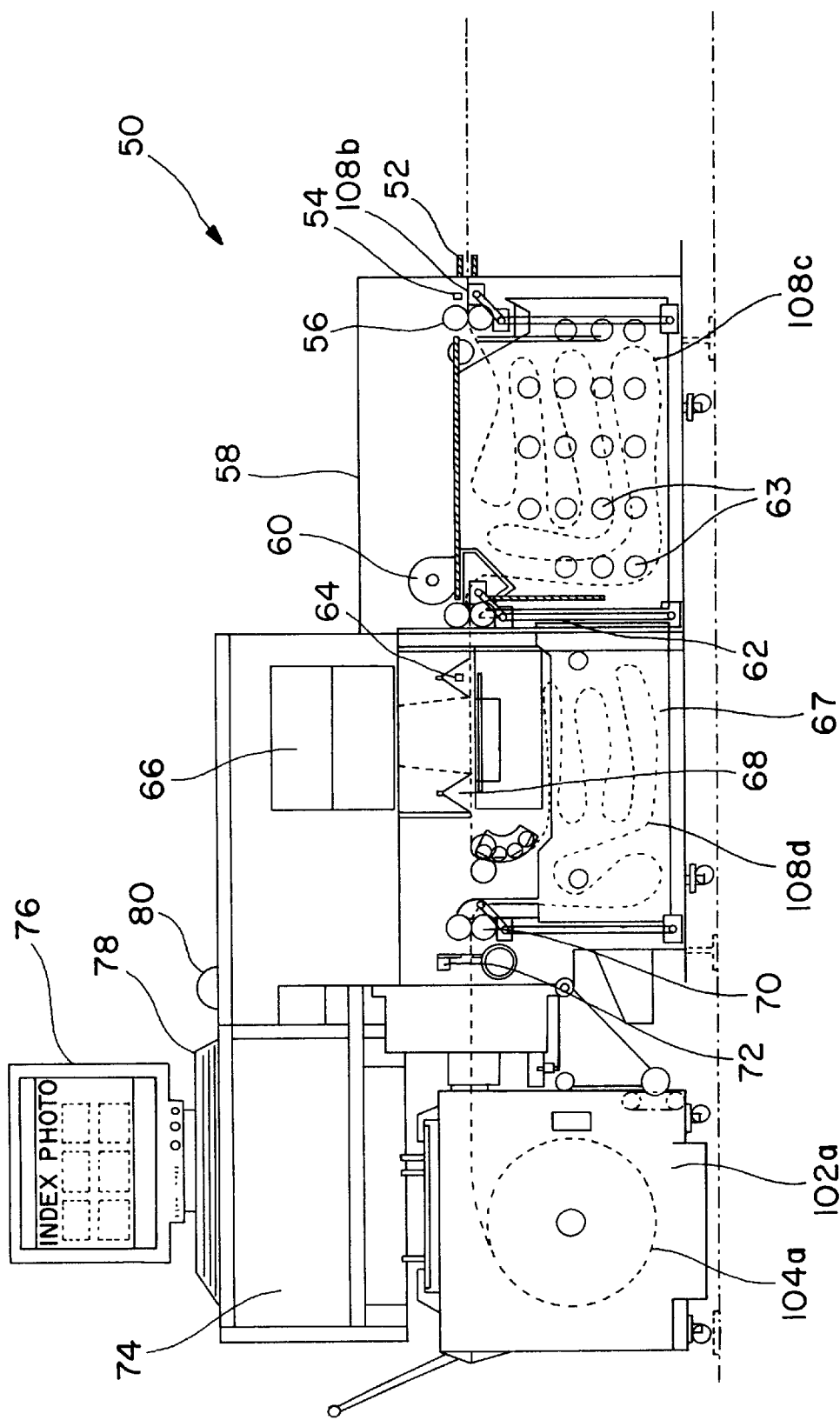
FIG. 2 is partial view complementary to FIG. 1, which completes a preferred embodiment according to the invention in schematic form.

The exposed material whereon for each order one region has been kept free in order to be exposed in the downstream second device for producing data or image data fields, in a conventional printer 10 moves into a magazine cart, but is here in the form of the mostly exposed material web 108a fed into an arrangement 50 according to FIG. 2.

The material band 108b is guided through a light sealed input 52 past a monitoring device 54, for example, in the form of a light barrier which operates in the infrared range, in order to detect markings which have been applied to or into the web 108b by the marking device 116. The material web 108b is transported into the material storage 58 by way of a pair of conveyor rolls 56.

In the material storage 58, the material web 108c is purely randomly laid down. The illustrated course of the material web 108c is only exemplary and can also look completely different.

Holes or openings 63 are provided in the side walls of the material storage 58 through which upon entry or exit of the material web 108c, an air removal or supply between the material webs and/or the material webs and the walls of the material storage 58 can take place.

At the pull out 62 with equally referenced output roller pair 62, a deflecting arrangement 60 is provided, here in the form of a ventilator. The ventilator 60 produces an air cushion before the outlet 62 so that only the end of the material web unit 108c can enter into the gap between the pair of output rollers 62. Subsequent loops of the material web 108c are kept away by the air cushion.

The outlet 62 is positioned at least at the same height of the inlet 56 to the material storage, but can also be positioned at a different height.

Especially, the entry 56 can be positioned lower than the outlet 62.

Adjacent to the outlet of the material storage or chaos storage 58 is the second device for producing data or image data fields 66, the exposure region of which is also provided with opaque sections 68 in order to protect those regions of the copy material web 108c, 108d which are adjacent to the exposure region of the second device or the CRT device 66 from an unwanted exposure. At one end of the exposure region of the second device 66 and especially at the forward end of the exposure region of the device 66 in direction of movement of the material web 108c, a monitoring arrangement 64 can again be provided which scans or detects a marking on the material web 108c which was applied onto or placed into the web at the marking arrangement 116.

The second device or CRT device 66 can be used to apply an index print to the material web as also explained in the generic prior art, or other types of information. For example, an information field could here also be applied onto the material web by way of which special and possibly fee based services can be offered, for example, copies of corrected light density could be offered, whereby a sample copy of an otherwise badly exposed copy could also be depicted in order to offer such services to the customer in an impressive way.

A further storage for web material 108d can be provided in the further path of the material web 108c, 108d, and here especially below the second device or the CRT exposure device 66. This storage can also be a chaos storage but may also be a roller storage. The here temporarily stored material is subsequently transported into a magazine cart 102a through take out rollers 70, possibly a cutting device 72, a docking station or similar known devices, to be rolled up in the form of a roll of exposed material web 104a.

A processor with image storage and the like 74 is also provided in order to intermediately store the image data captured by the scanner duo and processed into the index print images and to thereby correspondingly control the second device or exposure device 66.

Control inputs can be made by way of a keyboard 78 or possibly menu driven by way of a mouse 80. An index print photo can be observed on a screen 76 so that an operator here could possibly still make corrections or comments, if this is desired, for example, in an already mentioned value added manner or the like.

Figure 3:
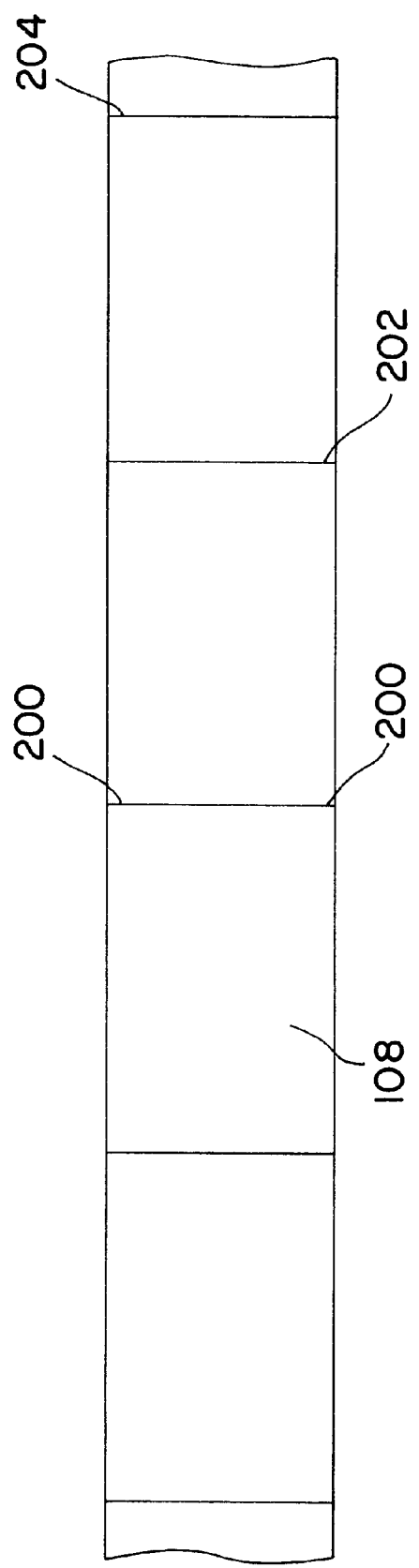
FIG. 3 schematically illustrates a material web section of a material web with copies.

FIG. 3 shows a section of a material web 108 with copies on which different markings 200, 202, 204 have been applied or possibly punched into through the placement of such markings. It is possible to control the band transporter before and after the material storage 58, and in the same manner exactly control the transport to as well as the exposure at the device 66.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. Apparatus for producing photographic copies on a band-shaped endless material comprising:

a) a device for scanning picture originals on a band-shaped endless material;

b) a first device for producing copies of said originals on a band-shaped endless copy material;

c) a second device for producing at least one of data and image data fields on said band-shaped endless copy material; and d) a material storage between the first and the second devices, said material storage having an inlet for randomly receiving the band-shaped endless copy material and an outlet to facilitate removal of the band-shaped endless copy material, wherein the material storage has a side wall which serves as a lateral guide for the endless copy material and which has openings for at least one of removing and feeding air between loops of the endless copy material.

2. Apparatus according to claim 1, wherein a deflecting device is positioned at the outlet of the material storage.

3. Apparatus according to claim 1, wherein a height of the inlet is the same as a height of the outlet.

4. Apparatus according to claim 1 comprising:

monitoring devices, positioned at the inlet for monitoring an actual amount of the stored band-shaped endless copy material which are to be exposed in a second device.

5. Apparatus according to claim 1, wherein a marking device is provided in a region of the first device which provides a marking for the band-shaped endless copy material for indicating a location and the time at which the second device is to be activated.

6. Apparatus according to claim 1, wherein the second device includes a monitoring device for detecting a marking in order to activate the second device.

7. Apparatus according to claim 1, wherein the first device is an optical exposure station.

8. Apparatus according to claim 1, wherein the second device is an optical exposure station.

9. Apparatus according to claim 1, wherein a material storage is located in a position following the second device.

10. Apparatus according to claim 1, wherein the material storage includes guides for laterally guiding the band-shaped endless copy material band in the storage, said guides being constructed as lateral material storage walls.

11. Apparatus according to claim 2, wherein the deflecting device is one of a high tension electrode, a roller and a ventilator.

12. Apparatus according to claim 1 comprising:

monitoring devices positioned at the outlet for monitoring an actual amount of the stored band-shaped endless copy material that is to be exposed in the second device.

13. Apparatus according to claim 1, wherein the first device is a digital exposure station.

14. Apparatus according to claim 1, wherein the second device is a digital exposure station.

* * * * *